(12) United States Patent
Yamada et al.

(10) Patent No.: US 8,602,498 B2
(45) Date of Patent: Dec. 10, 2013

(54) SEAT RECLINING APPARATUS

(75) Inventors: Yukifumi Yamada, Toyota (JP); Kazuhide Ishikawa, Anjo (JP); Shinya Isobe, Nagoya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 429 days.

(21) Appl. No.: 12/944,281

(22) Filed: Nov. 11, 2010

(65) Prior Publication Data

US 2011/0115271 A1    May 19, 2011

(30) Foreign Application Priority Data

Nov. 17, 2009 (JP) ................................. 2009-261906

(51) Int. Cl.
*B60N 2/235* (2006.01)

(52) U.S. Cl.
USPC .................................. 297/367 L; 297/367 R (58) Field of Classification Search
USPC ........................................ 297/367 L, 367 R
See application file for complete search history.

(56) References Cited

U.S. PATENT DOCUMENTS

| 6,474,740 | B1 * | 11/2002 | Kondo et al. ............. 297/367 R |
| 6,609,756 | B2 | 8/2003 | Kojima et al. |
| 6,626,495 | B2 * | 9/2003 | Okazaki et al. ........... 297/367 R |
| 6,715,835 | B2 * | 4/2004 | Hoshihara et al. ........... 297/366 |
| 6,722,738 | B2 * | 4/2004 | Uramichi ................. 297/367 R |
| 7,404,604 | B2 * | 7/2008 | Nag et al. ................. 297/367 R |
| 7,475,945 | B2 * | 1/2009 | Reubeuze et al. ........ 297/367 R |
| 7,588,294 | B2 * | 9/2009 | Matsumoto et al. ...... 297/367 R |
| 2005/0168034 | A1 * | 8/2005 | Fast ............................... 297/367 |
| 2009/0243361 | A1 * | 10/2009 | Tarusawa et al. ............. 297/362 |

FOREIGN PATENT DOCUMENTS

| JP | 2002-101996 | 4/2002 |
| JP | 2002-282078 | 10/2002 |
| WO | WO 2010/007895 A1 | 1/2010 |

OTHER PUBLICATIONS

U.S. Appl. No. 12/922,816, filed Sep. 15, 2010, Yukifumi Yamada, et al.

* cited by examiner

*Primary Examiner* — David Dunn
*Assistant Examiner* — Tania Abraham
(74) *Attorney, Agent, or Firm* — Oblon, Spivak, McClelland, Maier & Neustadt, L.L.P.

(57) ABSTRACT

A seat reclining apparatus includes a lower arm, an upper arm, plural pawls being movable in a radial direction along guide walls of the lower arm therewithin and including external teeth being engageable with and disengageable from internal teeth of the upper arm, a cam contacting and pressing the pawls in a direction of meshing the external teeth with the internal teeth when the cam is rotated in a locking direction, a biasing member, whose first and second end portions are engaged with an accommodating portion and the cam, respectively, biasing the cam in the locking direction, a restricting protrusion portion formed on a surface of the cam facing the lower arm and slidably contacting an inner surface of the accommodating portion in order to avoid an eccentricity of the cam, and an engagement protruding portion provided on the surface at a position radially inwardly of the restricting protrusion portion.

16 Claims, 6 Drawing Sheets

SEAT RECLINING APPARATUS

CROSS REFERENCE TO RELATED APPLICATIONS

This application is based on and claims priority under 35 U.S.C. §119 to Japanese Patent Application 2009-261906, filed on Nov. 17, 2009, the entire content of which is incorporated herein by reference.

TECHNICAL FIELD

This disclosure generally relates to a seat reclining apparatus for supporting a seat back relative to a seat cushion while allowing an angle of the seat back relative to the seat cushion to be adjustable.

BACKGROUND

Examples of a known seat reclining apparatus are disclosed in JP2002-282078A and in JP2002-101996A. The seat reclining apparatus disclosed in JP2002-282078A includes a lower arm, an upper arm and a lock mechanism. The lower arm is retained by a seat cushion and includes two pawls, each of which has external teeth at an end portion thereof. The upper arm is rotatably supported by the lower arm and is fixed at a seat back. Furthermore, internal teeth are formed at the upper arm so as to be engageable with and disengageable from the external teeth of each of the pawls. The lock mechanism includes a cam and a spring for locking the engagement between the upper arm and each of the pawls.

In order to adjust an inclining angle of the seat back, a user needs to pull up an operation lever in order to rotate the cam in an unlocking direction so as to resist against a spring force of the spring to displace the pawls in a radially inward direction of the lower arm and disengage the external teeth of the pawls from the internal teeth of the upper arm. As a result, the engagement between the upper arm and each of the pawls is unlocked. Then, after the inclining angle of the seat back is adjusted, the cam rotates in a locking direction by the spring force of the spring in order to displace the pawls in a radially outward direction of the lower arm, thereby engaging the external teeth of the pawls with the internal teeth of the upper arm. As a result, the engagement between the upper arm and each of the pawls is locked. A pair of supporting portions, each of which is formed in an arc shape when being viewed from front and each of which protrudes in a direction corresponding to a rotational axis, is formed at an intermediate portion of the lower arm so as to face each other in a radial direction of the lower arm. The cam includes a pair of elongated grooves, each of which is formed in an arc and into which the corresponding supporting portions are freely engaged. Accordingly, the cam is allowed to rotate while avoiding an eccentricity thereof by the pair of the supporting portions.

The seat reclining apparatus disclosed in JP2002-101996A includes a lower arm, an upper arm and a lock mechanism, which are similar to the lower arm, the upper arm and the lock mechanism of the seat reclining apparatus disclosed in JP2002-282078A. The seat reclining apparatus disclosed in JP2002-101996A differs from the seat reclining apparatus disclosed in JP2002-282078A in that the seat reclining apparatus disclosed in JP2002-101996A includes three pawls. Three guide portions, each of which is formed in a trapezoidal shape when being viewed from front and each of which protrudes in a direction corresponding to a rotational axis, are formed at the lower arm while keeping an equal angular distance (approximately 120 degrees) between the neighboring guide portions about the rotational axis. The guide portions guide a movement of the pawls in a radial direction at wall surfaces, which extend in the radial direction, of the corresponding guide portions. Furthermore, the guide portions normally guide an outer circumferential surface of the cam at arc-shaped inner wall surfaces of the corresponding guide portions. Accordingly, the cam is allowed to rotate while avoiding an eccentricity thereof.

For example, a seat reclining apparatus, which has a high engagement strength of the pawls relative the lower arm and whose size and weight is relatively small, is required for a vehicle seat. In order to increase the engagement strength of the pawls relative to the lower arm, for example, a number of pawls may need to be increased (i.e. additional pawls may be added to the seat reclining apparatus). However, according to the seat reclining apparatus disclosed in JP2002-282078A, the supporting portions for restricting the eccentricity of the cam need to be provided at the lower arm and the grooves into which the corresponding supporting portions are inserted need to be formed at the cam. Therefore, a size of the cam in the radial direction thereof needs to be enlarged in order to ensure a rigidity of the cam, which may result in an increase of the seat reclining apparatus, specifically, a size of the seat reclining apparatus may be increased in a rotational radial direction. Furthermore, the arc-shaped elongated grooves, into which the corresponding supporting portions are freely engaged, need to be formed at the cam. Therefore, in the case where the number of the pawls is increased, the number of elongated grooves also needs to be increased, which my result in decreasing the rigidity of the cam. As a result, the engagement of the pawls relative to the lower arm may not be maintained. On the other hand, according to the seat reclining apparatus disclosed in JP2002-101996A, the eccentricity of the cam is avoided in a manner where the outer circumferential surface of the cam slides against a surface of protrusions, which face the axis of the seat reclining apparatus and which are formed at the lower arm. Therefore, the seat reclining apparatus disclosed in JP2002-101996A does not need to include the supporting portions and the groove portions of the seat reclining apparatus disclosed in JP2002-282078A at the lower arm and the cam, respectively. Accordingly, the seat reclining apparatus disclosed in JP2002-101996A may not cause a reduction in the rigidity of the cam or an increase of a size of the seat reclining apparatus in the radial direction.

However, according to the seat reclining apparatus disclosed in JP2002-101996A, in a case where, for example, a number of the pawls is increased to four from three within a limited space, four guide portions, each of which is formed in a triangle shape when being viewed from front, need to be formed at the lower arm so as to protrude in the direction extending along the rotational axis while keeping an equal angular distance (approximately 90 degrees) between the neighboring guide portions about the rotational axis because of the limited space. The guide portions may guide the movement of the pawls in the radial direction by the wall surfaces of the corresponding portions extending in the radial direction. However, an inner circumferential wall surface of each of the guide portions for guiding the rotation of the cam is positioned at a corner of the triangle shape thereof. Therefore, an area of the arc-shaped wall surface of each of the guide portions for guiding the outer circumferential surface of the cam may be reduced. As a result, the guide portions may not normally restrict the eccentricity of the cam when rotating. In order to normally restrict the eccentricity of the cam when rotating, an additional and separate eccentricity restricting member may need to be provided at the seat reclining apparatus. However, providing the additional and separate eccentricity restricting member may lead to an increase of a size and a weight of the seat reclining apparatus, which may further result in an increase of manufacturing costs of the seat reclining apparatus.

A need thus exists to provide a seat reclining apparatus which is not susceptible to the drawback mentioned above.

SUMMARY

According to an aspect of this disclosure, a seat reclining apparatus includes a lower arm adapted to be supported by a seat cushion, an upper arm adapted to be supported by a seat back and supported by the lower arm so as to be rotatable relative to the lower arm, a plurality of pawls provided at an inside of the lower arm so as to be movable in a radial direction thereof along guide walls provided at the lower arm and including external teeth, which are engageable with and disengageable from internal teeth formed on an inner circumferential surface of the upper arm, a cam including a cam surface, at which the cam contacts a cam contacting portion formed on each of the plurality of pawls, and pressing the pawls in a direction by which the external teeth of the pawls mesh with the internal teeth of the upper arm in response to a rotation of the cam in a locking direction, a biasing member arranged within an accommodating portion, which is formed on a rotational center portion of the lower arm, engaged with an inner circumferential surface of the accommodating portion at a first end portion, engaged with the cam at a second end portion and biasing the cam so as to rotate the cam in the locking direction, a restricting protrusion portion formed on a surface of the cam facing the lower arm and slidably contacting the inner circumferential surface of the accommodating portion in order to avoid an eccentricity of the cam when being rotated, and an engagement protruding portion provided on the surface of the cam facing the lower arm at a position displaced from the restricting protrusion portion in a radially inward direction of the cam and engaging therewith the second end portion of the biasing member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a seat reclining apparatus 10 for a vehicle (which will be hereinafter referred to simply as the seat reclining apparatus 10) will be described below with reference to the attached drawings. As illustrated in FIGS. 1 to 4, the seat reclining apparatus 10 includes a lower arm 11 and an upper arm 12, each of which is formed in a disc shape. The lower arm 11 is fixed on a seat cushion frame 13. The upper arm 12 is fixed on a seat back frame 14.

The lower arm 11 includes a round-shaped recessed portion 21, which is formed by applying a half blanking processing thereto and which opens towards the upper arm 12, and a through hole 11a, which is formed at a rotational center portion of the lower arm 11 and into which a spiral spring 34 is accommodated. The through hole 11a serves as an accommodating portion. Additionally, the accommodating portion is not limited to the through hole 11a. Any desired shape of a hole or bore may be formed at the lower arm 11 as long as the spiral spring 34 is accommodatable therein. The round-shaped recessed portion 21 of the lower arm 11 includes an inner circumferential surface 21a centering on a rotational axis O1 of the lower arm 11 and the upper arm 12. The upper arm 12 is fitted relative to the lower arm 11 at an outer circumferential surface 12a of the upper arm 12 so that the outer circumferential surface 12a of the upper arm 12 slidably contacts the inner circumferential surface 21a of the lower arm 11.

The upper arm 12 includes a first round-shaped recessed portion 22, which is formed by applying a half blanking processing hereto and which opens towards the lower arm 11, and a through hole 12b, which is formed at a rotational center portion of the upper arm 12. The first round-shaped recessed portion 22 of the upper arm 12 includes a first inner circumferential surface 22a centering on the rotational axis O1. Internal teeth 23 are formed along the entire first inner circumferential surface 22a of the first round-shaped recessed portion 22. A second round-shaped recessed portion 24 is formed on the upper arm 12 so as to be positioned radially inwardly of the first round-shaped recessed portion 22 in a concentric manner by applying a half blanking processing thereto. Two protruding portions 25 are formed at a second inner circumferential surface 24a of the second round-shaped recessed portion 24 so as to protrude towards the rotational axis O1. In this embodiment, the two protruding portions 25 are formed on the second inner circumferential surface 24a so as to face to each other in a radial direction of the upper arm 12.

A holder 27, which is made of a metal plate and which is formed in a ring-shape, is attached on outer circumferential portions of the lower arm 11 and the upper arm 12 in a state where the inner circumferential surfaces 21a of the round-shaped recessed portion 21 of the lower arm 11 contacts the outer circumferential surfaces 12a of the upper arm 12 (i.e. in a state where the upper arm 12 is attached on the lower arm 11). Accordingly, the holder 27 prevents the lower arm 11 and the upper arm 12 from being disengaged from each other in an axial direction while allowing the lower arm 11 and the upper arm 12 to rotate relative to each other.

A lock mechanism 30 is provided between the lower arm 11 and the upper arm 12. The lock mechanism 30 mainly includes four pawls (a first pawl 31A, a second pawl 31B, a third pawl 31C and a fourth pawl 31D), a cam 32, a release plate 33 and the spiral spring 34 serving as a biasing member. The first pawl 31A differs from the second, third and fourth pawls 31B, 31C and 31D in shape. However, the first, second, third and fourth pawls 31A, 31B, 31C and 31D are arranged so as to away from each other by a predetermined angular distance (e.g. 90 degrees) between the neighboring pawls about the rotational axis O1 and so as to be orthogonal to the rotational axis O1.

The first pawl 31A is formed by applying a forge processing to a steel material or the like. The first pawl 31A includes a first block 41 and a second block 42, which are formed on the first pawl 31A so as to form a stepwise shape when being viewed from a side surface thereof (i.e. the first block 41 and the second block 42 are formed on the first pawl 31A so as to be displaced from each other in the axial direction). Furthermore, the first pawl 31A is arranged at the seat reclining apparatus 10 so that the first block 41 is positioned closer to the first inner circumferential surface 22a of the upper arm 12 and the second block 42 is positioned closer to the axis of the upper arm 12. Additionally, a width of the first block 41 in a circumferential direction of the first pawl 31A is formed to be the same as a width of the second block 42 in the circumferential direction, so that end portions 31A1 of the first pawl 31A in the circumferential direction (in a width direction) are leveled and so that the end portions 31A1 of the first pawl 31A are formed to draw straight lines parallel to each other. External teeth 44 are formed at a radially outer end portion of the first block 41 (i.e. an outer end surface of the first block 41 facing the inner teeth 23 of the upper arm 12) so as to be meshed with the internal teeth 23 of the upper arm 12. On the other hand, a cam contacting portion 45 is formed at a radially inner end portion of the first block 41 (i.e. an inner end surface of the first block 41 positioned opposite to the outer end surface in the radial direction). The first pawl 31A engages with an outer circumferential portion of the cam 32 at cam contacting portion 45. Still further, a guide groove 46 is formed at the second block 42 so as to penetrate therethrough in a thickness direction at a substantially intermediate portion of the second block 42 in the width direction.

Each of the second, third and fourth pawls 31B, 31C and 31D is formed by applying a pressing to a plate-shaped steel material or the like. More specifically, each of the second, third and fourth pawls 31B, 31C and 31D differs from the first pawl 31A in that each of the second, third and fourth pawls 31B, 31C and 31D does not include a portion corresponding to the second block 42, so that each of the second, third and fourth pawls 31B, 31C and 31D is formed so as to have a similar shape as the first block 41, therefore, each of the second, third and fourth pawls 31B, 31C and 31D is formed in a flat shape (so as not to have a stepwise shape). Accordingly, each of the second, third and fourth pawls 31B, 31C and 31D is formed so that a height thereof in a radial direction is shorter than the first pawl 31A by the height of the second block 42 in the radial direction. Furthermore, each of the second, third and fourth pawls 31B, 31C and 31D is formed so that a thickness thereof in the axial direction is thinner than the first pawl 31A by a thickness of the second block 42 in the axial direction. As is the case with the first pawl 31A, each of the second, third and fourth pawls 31B, 31C and 31D is formed so that end portions 31B1 thereof form straight lines parallel to each other. External teeth 47 are formed at a radially outer end portion of each of the second, third and fourth pawls 31B, 31C and 31D so as to be meshed with the inner teeth 23 of the upper arm 12. Furthermore, an inner surface cam portion 48 is formed at each of the second, third and fourth pawls 31B, 31C and 31D, so that each of the second, third and fourth pawls 31B, 31C and 31D engages with the outer circumferential portion of the cam 32 at the inner surface cam portion 48. Still further, an engagement protrusion 49 is formed at an intermediate portion of each of the second, third and fourth pawls 31B, 31C and 31D in the width direction by applying a half blanking thereto.

The cam contacting portion 45 formed at a stepped portion of the first pawl 31A is formed to have the same shape as the inner surface cam portions 48 formed at the radially inner end portions of the second, third and fourth pawls 31B, 31C and 31D, respectively. Accordingly, each of the cam contacting portions 45 and 48 includes a first pressing portion 50a at an intermediate portion thereof in the circumferential direction, a second pressing portion 50b and a third pressing portion 50c at respective end portions of each of the cam contacting portions 45 and 48 in the circumferential direction, so that a cam surface 55 of the cam 32 acts on each pawl 31 via the first, second and third pressing portions 50a, 50b and 50c. More specifically, each of the first, second and third pressing portions 50a, 50b and 50c of each of the first, second and third pawls 31A, 31B and 31C is formed to have a cam surface, which includes an inclined surface that is positioned closer to the cam surface 55 of the cam 32 as the cam 32 is rotated in a locking rotational direction. The fourth pawl 31D is formed to have a similar shape as the second and third pawls 31B and 31C. However, the fourth pawl 31D does not include a portion corresponding to the third pressing portion 50c of the second and third pawls 31B and 31C, instead, the fourth pawl 31D includes a separator acting portion 72.

Figure 4:
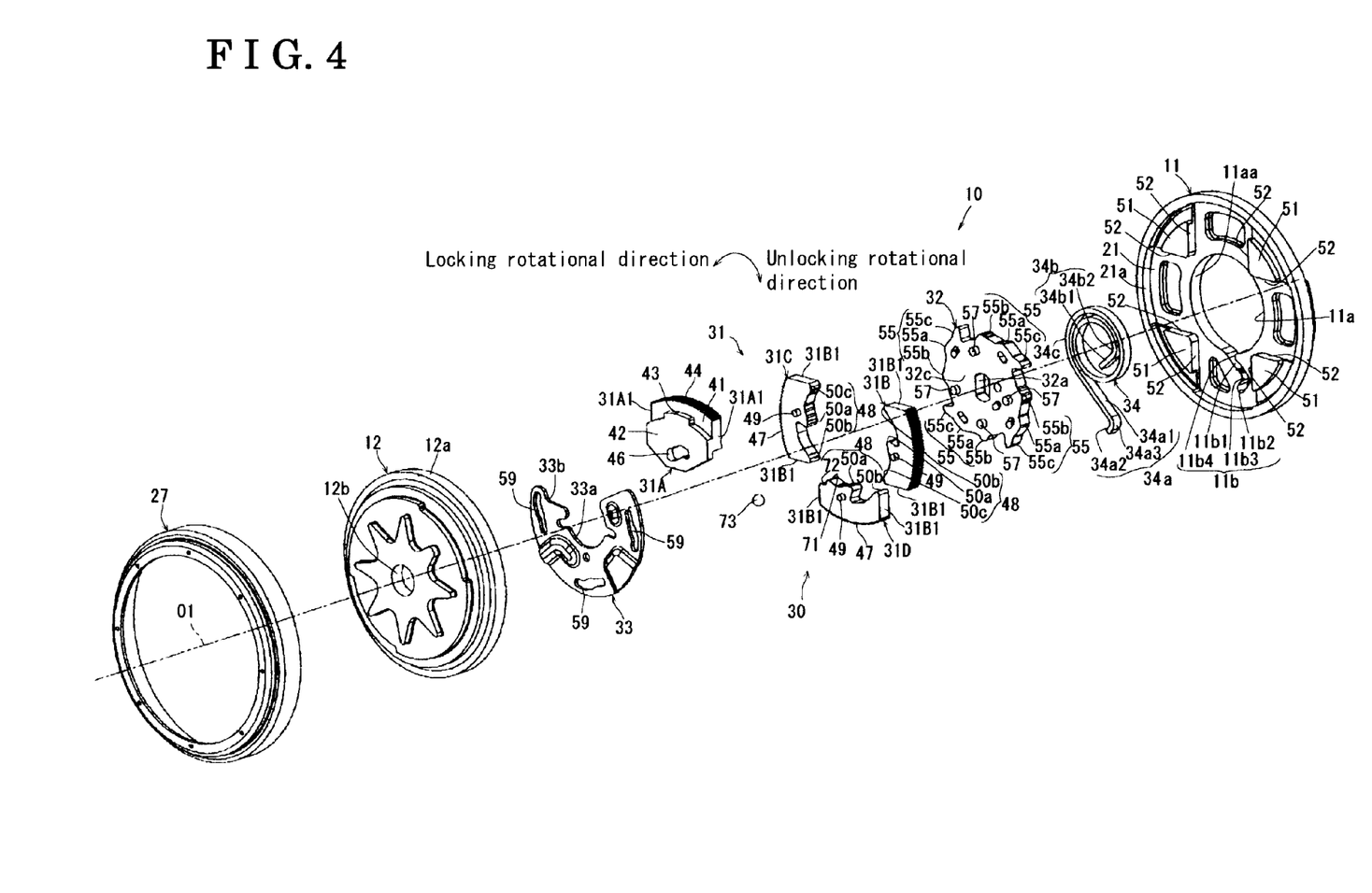
FIG. 4 is an exploded perspective view illustrating the seat reclining apparatus when being viewed from an upper arm.

Four guide walls 51 are arranged within the round-shaped recessed portion 21 of the lower arm 11 so as to be away from each other by an equal angular distance (90 degrees) between the neighboring guide walls 51 in the circumferential direction (see FIG. 4). Furthermore, each guide wall 51 includes guide surfaces 52, which extend in parallel to the corresponding guide surfaces 52 of the neighboring guide walls 51, so that the end portions 31A1 of the first pawl 31A and the end portions 31B1 of the second, third and fourth pawls 31B, 31C and 31D are slidably guided along the guide surfaces 52 of the neighboring guide walls 51. Accordingly, each of the first, second, third and fourth pawls 31A, 31B, 31C and 31D is guided by the guide surfaces 52 of the guide walls 51 so as to be slidably moved in the radial direction of the lower arm 12 and the upper arm 12, which results in engaging and disengaging the outer teeth 44 and 47 with and from the inner teeth 23.

Figure 5:
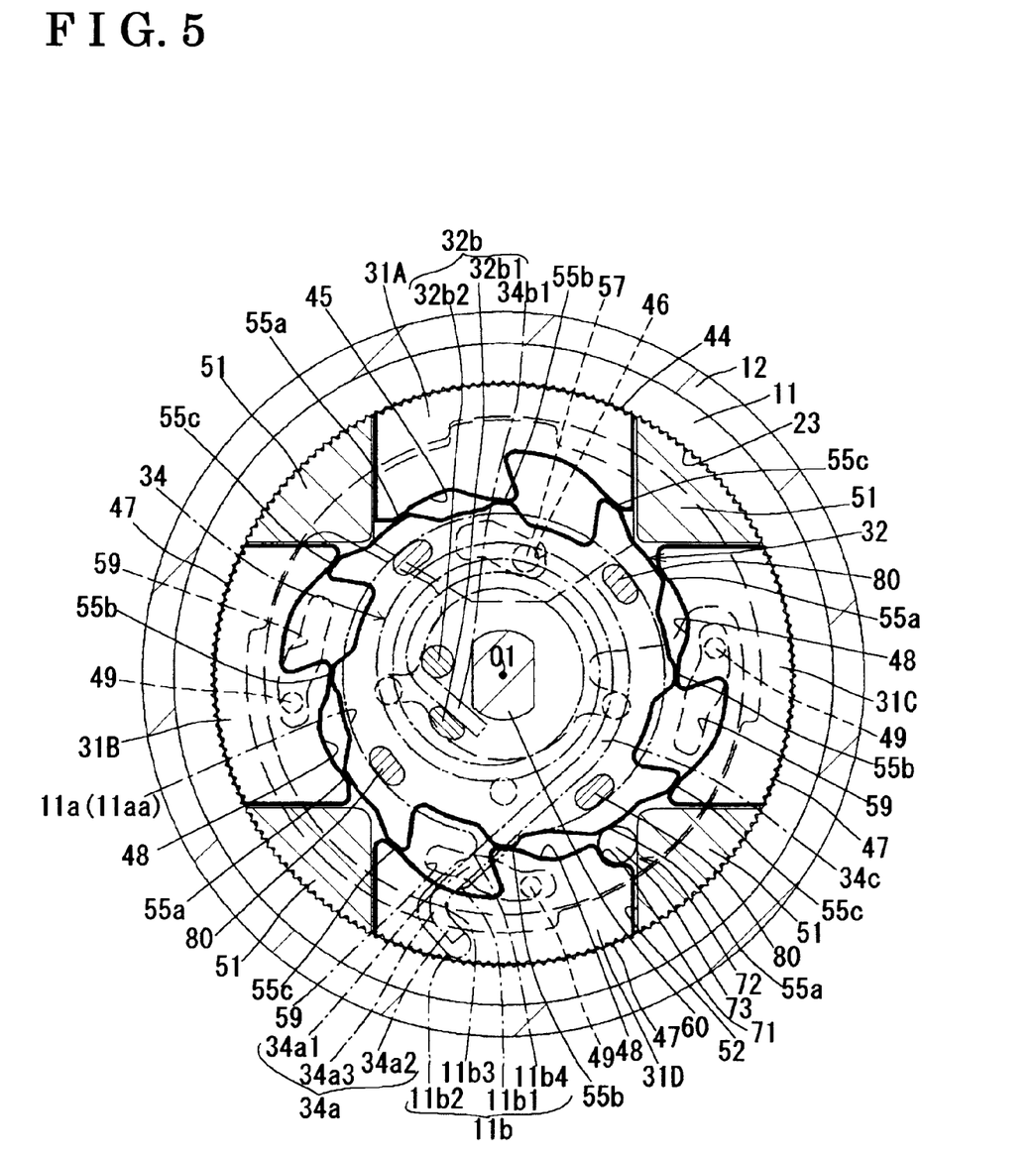
FIG. 5 is a cross-sectional diagram illustrating a state of a lock mechanism when being in a locked state taken along line V-V in FIG. 2.

An inclined surface 71 is formed in the vicinity of one end portion of the fourth pawl 31D in the circumferential direction so as to face the guide surface 52 of the neighboring guide wall 51. As illustrated in FIG. 5, the inclined surface 71 forms the separator acting portion 72, which is formed so that a distance between the inclined surface 71 and the neighboring guide wall 51 becomes narrower in the radially outward direction. More specifically, the separator acting portion 72 is formed so that, for example, a clearance between the guide surface 52 of the guide wall 51 and the inclined surface 71 is gradually narrowed in the radially outward direction while a center line between the guide surface 52 and the inclined surface 71 extends towards the rotational axis O1 of the cam 32. However, the shape of the separator acting portion 72 (the inclined surface 71) is not limited to the aforementioned shape, as long as the inclined surface 71 has wedging action (i.e. an action of separating the fourth pawl 31D and the neighboring guide wall 51 from each other). A separator member 73, which is formed in a substantially round shape and contacts the inclined surface 71 and the corresponding guide surface 52, is provided at the separator acting portion 72. The separator member 73 is held between an end surface of the round-shaped recessed portion 21 of the lower arm 11 and an outer circumferential edge portion of the release plate 33 in the axial direction of the cam 32, while allowing the separator member 73 to be displaceable in the radial direction of the cam 32 with contacting the inclined surface 71 and the corresponding guide surface 52. Furthermore, when the separator member 73 is pressed in the radially outward direction by the cam surface 55 of the cam 32, the fourth pawl 31D, which is engaged with the upper arm 12, is moved relative to corresponding guide wall 51, which is provided at the lower arm 11, in a direction away from each other by means of the separator acting portion 72.

The cam 32 of the lock mechanism 30 is arranged within the round-shaped recessed portion 22 of the upper arm 12 while allowing the cam 32 to rotate about the rotational axis O1. The cam 32 includes a through hole 32a at a rotational center portion thereof. Furthermore, the cam 32 includes four sets of cam surfaces 55 at an outer edge portion thereof while being away from each other by an equal angular distance between the neighboring cam surfaces 55 in a circumferential direction of the cam 32. The cam 32 is arranged at the seat reclining apparatus 10 so that one set of the four sets of the cam surfaces 55 is engageable with each of the first, second and third pressing portions 50a, 50b and 50c of the cam contacting portion 45 of the first pawl 31A, so that two sets of the remaining three sets of the cam surfaces 55 are engageable with each of the first, second and third pressing portions 50a, 50b and 50c of the inner surface cam portions 48 of the second and third pawls 31B and 31C, respectively, and so that the remaining cam surface 55 is engageable with each of the first, second and third pressing portions 50a, 50b and 50c of the inner surface cam portion 48 of the fourth pawl 31D. The cam 32 is formed so that the cam surfaces 55 press the corresponding first, second, third and fourth pawls 31A, 31B, 31C and 31D at portions closer to meshed portion between the internal teeth 23 on the one hand and the external teeth 44 and 47 on the other hand in order to surely lock the upper arm 12 relative to the lower arm 11 with a relatively strong force.

Each of three sets of the cam surfaces 55 out of the four sets of the cam surfaces 55 includes first, second and third pressing cam portions 55a, 55b and 55c, which are contactable with the respective first, second and third pressing portions 50a, 50b, 50c of each of the first, second and third pawls 31A, 31B and 31C. Similarly, the remaining set of the cam surfaces 55 includes the first, second and third pressing cam portions 55a, 55b and 55c, which are contactable with the first and second pressing portions 50a and 50b and the separator member 73, respectively. In a case where the cam 32 is rotated to a locked position, the first, second and third pressing cam portions 55a, 55b and 55c are retained at angular positions at which the first, second and third cam portions 55a, 55b and 55c of the cam surfaces 55 contact the first, second and third pressing portions 50a, 50b and 50c of the cam contacting portions 45 and 48 of the first, second and third pawls 31A, 31B and 31C and the first and second pressing portions 50a and 50b and the separator member 73 of the inner surface cam portion 48 of the fourth pawl 31D, respectively. On the other hand, in a case where the cam 32 is rotated in an unlocking direction, the first, second and third pressing cam portions 55a, 55b and 55c of the cam surfaces 55 are moved away from the first, second and third pressing portions 50a, 50b and 50c of the cam contacting portions 45 and 48 of the first, second and third pawls 31A, 31B and 31C and the first and second pressing portions 50a and 50b and the separator member 73 of the inner surface cam portion 48 of the fourth pawl 31D, respectively.

Plural engagement protrusions 57 (in this embodiment, four engagement protrusions 57) are formed at a first side surface 32c of the cam 32 facing the upper arm 12. More specifically, the engagement protrusions 57 are formed on the first side surface 32c by applying a half blanking to the cam 32 so as to extend therefrom in the axial direction while keeping a predetermined distance between the neighboring engagement protrusions 57 in the circumferential direction. One of the engagement protrusions 57 engages with the guide groove 46, which is formed on the first pawl 31A. The guide groove 46 is formed so that one end portion thereof in the circumferential direction of the first pawl 31A is positioned radially inwardly of the other end portion of the groove cam portion 46. Accordingly, the guide groove 46 and the engagement protrusion 57, which is engaged with the guide groove 46, acts on the first pawl 31A so as to displace the first pawl 31A in the radially inward direction in response to the rotation of the cam 32 in the unlocking direction. Additionally, the engagement protrusions 57 may be arranged so as to form a predetermined equal angle (e.g. 90 degrees) between the neighboring engagement protrusions 57.

Figure 3:
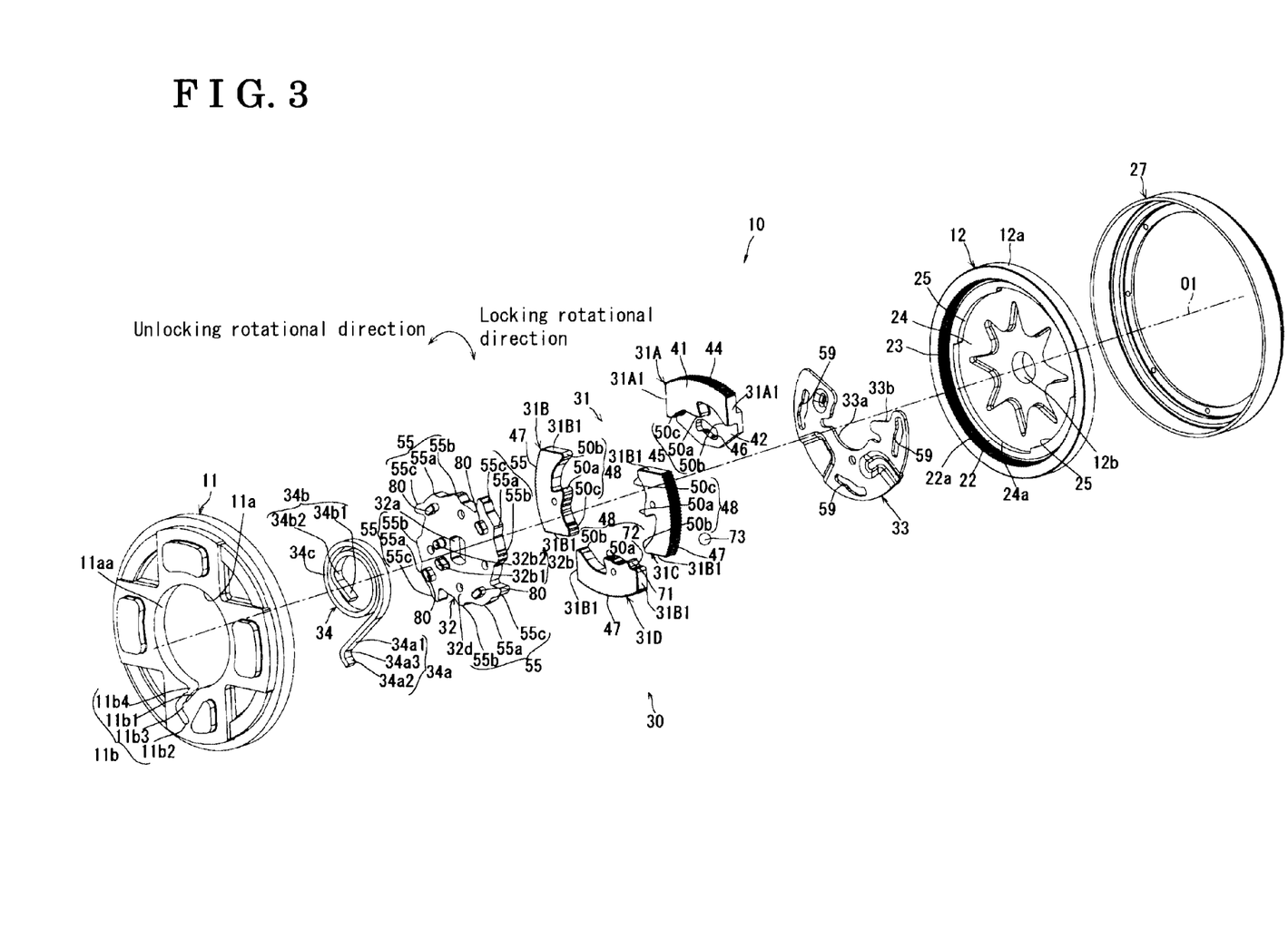
FIG. 3 is an exploded perspective view illustrating the seat reclining apparatus when being viewed from the lower arm.

Plural restricting protrusion portions 80 (in this embodiment, four restricting protrusion portions 80) for restricting (avoiding) an eccentricity of the cam 32 when being rotated are formed on a second side surface 32d of the cam 32 facing the lower arm 11. More specifically, the restricting protrusion portions 80 are formed on the second side surface 32d of the cam 32 by applying a half blanking thereto so as to protrude therefrom in the axial direction while being spaced away from each other by a predetermined equal angular distance (e.g. 90 degrees) relative to the rotational axis O1. The restricting protrusion portions 80 slidably contact an inner circumferential surface 11aa of the through hole 11a formed on the lower arm 11 in order to rotate the cam 32 about the rotational axis O1 so as not to be eccentric. Furthermore, an engagement protruding portion 32b (a first engagement protruding portion 32b1 and a second engagement protruding portion 32b2), at which an inner end portion 34b (a second end portion) of the spiral spring 34 is engaged, is formed at the second side surface 32d of the cam 32 facing the lower arm 11 at a position radially inwardly of the restricting protrusion portions 80. The engagement protruding portion 32b is formed at the second side surface 32d of the cam 32 by applying a half blanking thereto so as to protrude therefrom in the axial direction. As illustrated in FIG. 3, because the restricting protrusion portions 80 and the engagement protruding portion 32b (the first and second engagement protruding portions 32b1 and 32b2) are formed so as to be positioned away from each other in the radial direction of the cam 32, the restricting protrusion portions 80, the engagement protruding portion 32b (the first and second engagement protruding portions 32b1 and 32b2) and the spiral spring 34, which is engaged with the engagement protruding portion 32b (the first and second engagement protruding portions 32b1 and 32b2), are accommodated within an area corresponding to a width of the through hole 11a of the lower arm 11 in the axial direction. A diameter of a circle, which is formed by connecting radially outer surfaces of the restricting protrusion portions 80, is slightly narrower than the diameter of the through hole 11a of the lower arm 11, so that a clearance is formed between the restricting protrusion portions 80 and the through hole 11a in the radial direction. Accordingly, the cam 32 is allowed to slightly move in the radial direction relative to a hinge shaft 60 within the first round-shaped recessed portion 22 of the upper arm 12.

The release plate 33 is formed in a thin plate shape. The release plate 33 includes a concave portion 33a at a rotational center portion thereof. The release plate 33 is attached on the first side surface 32c of the cam 32 in a manner where the release plate 33 is engaged with the engagement protrusions 57, which is formed on the first side surface 32c of the cam 32 facing the upper arm 12. More specifically, the release plate 33 is attached on the cam 32 so as to be aligned relative to the second block 42 of the first pawl 31A in a direction orthogonal to the axial direction, so that the release plate 33 slidably contacts with side surfaces of the respective second, third and fourth pawls 31B, 31C and 31D facing the upper arm 12. Accordingly, the second, third and fourth pawls 31B, 31C and 31D and the release plate 33 are arranged (accommodated) within an area corresponding to the thickness of the first pawl 31A. The release plate 33, which has a shape by which the release plate 33 does not contact the protruding portions 25 of the upper arm 12, is formed in a manner where a sectorial-shaped cut out 33b is formed on a portion of a substantially annular shaped plate. The first pawl 31A is arranged at the cut out 33b of the release plate 33. In other words, the release plate 33 is avoided from interfering with the first pawl 31A in response to the rotation of the cam 32 by providing the sectorial-shaped cut out to the annular-shaped plate by an area corresponding to the first pawl 31A.

Three guide grooves 59 are formed at the release plate 33 so as to penetrate therethrough in a thickness direction and so as to be arranged in a circumferential direction about the rotational center of the release plate 33. More specifically, the guide grooves 59 are formed on the release plate 33 so as to be positioned radially outwardly of the engagement protrusions 57, respectively, so that the guide grooves 59 correspond to the side surfaces of the respective second, third and fourth pawls 31B, 31C and 31D facing the upper arm 12. Furthermore, each of the guide grooves 59 is formed on the release plate 33 so as to extend in the circumferential direction while one end portion of the guide groove 59 in the circumferential direction is positioned radially inwardly of the other end portion of the guide groove 59. The engagement protrusions 49, which are formed on the respective second, third and fourth pawls 31B, 31C and 31D so as to protrude therefrom, are engaged with the guide grooves 59 of the release plate 33, respectively. In the case where the cam 32 is rotated in the unlocking direction together with the release plate 33, the release plate 33 displaces the second, third and fourth pawls 31B, 31C and 31D in the radially inward direction because the engagement protrusions 49 are engaged within the respective guide grooves 59 of the release plate 33.

The hinge shaft 60 is arranged coaxially with the rotational axis O1. The hinge shaft 60 penetrates through the through holes 11a, 32a and 12b and the concave portion 33a, which are formed on the rotational center portions of the respective lower arm 11, the cam 32, the upper arm 12 and the release plate 33, respectively, while allowing the hinge shaft 60 to be rotatable. A fitting portion 60a, which is obtained by applying chamfering to two portions of a cylinder-shaped shaft (i.e. a substantially ellipse shape when being viewed in an axial direction of the hinge shaft 60), is formed at a substantially intermediate portion of the hinge shaft 60 in an axial direction thereof. The through hole 32a of the cam 32, through which the hinge shaft 60 penetrates, is formed in a shape, having two straight and parallel lines and two arc shapes continuing from end portions of the straight lines (i.e. a substantially ellipse shape when being viewed in the axial direction of the cam 32), so as to correspond to the shape of the fitting portion 60a of the hinge shaft 60. Accordingly, the fitting portion 60a of the hinge shaft 60 is fitted into the through hole 32a of the cam 32, therefore, the hinge shaft 60 and the cam 32 are rotated together as a unit. The through hole 32a of the cam 32 is formed so as to be slightly larger than a size of the fitting portion 60a of the hinge shaft 60, so that a clearance is formed therebetween. Accordingly, the cam 32 is slightly movable in the radial direction relative to the hinge shaft 60 within the first round-shaped recessed portion 22 of the upper arm 12. Additionally, an engagement portion 60b is formed at one end portion of the hinge shaft 60 in the axial direction. More specifically, the engagement portion 60b is formed in a shape, which is obtained by applying chamfering to two portions of the cylinder-shaped shaft, so that the engagement portion 60b is formed in a substantially ellipse shape in cross-section. An engagement hole, which is formed in a shape having two straight and parallel lines and tow arc shapes continuing from end portions of the straight lines (i.e. a substantially ellipse shape in cross-section), is formed on an operation handle 62, so that the operation handle 62 is fitted on the hinge shaft 60.

The spiral spring 34 biases the cam 32 in a direction by which the pawls 31 is engaged with the upper arm 12. The spiral spring 34 is accommodated within the through hole 11a of the lower arm 11 while avoiding a contact with inner circumferential surfaces of the respective restricting protrusion portions 80. The spiral spring 34 is formed by curling an elongated-shaped flat wire rod in a predetermined spiral shape. Furthermore, the spiral spring 34 is provided between the lower arm 11 and the cam 32. The spiral spring 34 includes an outer end portion 34a (a first end portion), the inner end portion 34b (the second end portion) and a curling portion 34c, which is positioned between the outer end portion 34a and the inner end portion 34b and at which the spring 34 is curved and curled. The outer end portion 34a of the spiral spring 34 is engaged within an engagement cut-out portion, which is formed on the lower arm 11 as an engagement portion 11b (an engagement cut-out portion). On the other hand, the inner end portion 34b of the spiral spring 34 is engaged with the engagement protruding portion 32b formed on the second side surface 32d of the cam 32.

The outer end portion 34a of the spiral spring 34 includes a straight portion 34a1, which extends straight in a tangential direction, and a curved portion 34a2, which is positioned outwardly of the straight portion 34a1 and at which the end portion of the spiral spring 34 is outwardly curved. Furthermore, the outer end portion 34a of the spiral spring 34 includes a recessed portion 34a3, which is formed in an arc shape and which is positioned at a connected portion between the straight portion 34a1 and the curved portion 34a2. On the other hand, the inner end portion 34b of the spiral spring 34 includes a bent portion 34b1, which extends straight towards a center of the spiral spring 34, and a connecting portion 34b2, which is a curved portion positioned between the bend portion 34b1 and the curling portion 34c.

The engagement portion 11b of the lower arm 11, at which the outer end portion 34a of the spiral spring 34 is engaged, includes a recessed leading portion 11b1, which extends in a tangential direction of the through hole 11a of the lower arm 11, and a recessed curved portion 11b2, which forms a curved shape extending from an end portion of the recessed leading portion 11b1. The engagement portion 11b is formed on the lower arm 11 at a position so as not to interfere with a slidable contact range of the restricting protrusion portions 80 within the through hole 11a of the lower arm 11 in response to an operation of the cam 32. The straight portion 34a1 of the outer end portion 34a of the spiral spring 34 is inserted into the recessed leading portion 11b1, and the curved portion 34a2 of the outer end portion 34a is fitted into the recessed curved portion 11b2. A first protruding portion 11b3, at which the arc-shaped recessed portion 34a3 formed at the connecting portion between the straight portion 34a1 and the curved portion 34a2 of the outer end portion 34a of the spiral spring 34 contacts, is formed at the recessed leading portion 11b1. Furthermore, the recessed leading portion 11b1 includes a second protruding portion 11b4 at a position across the straight portion 34a1 of the spiral spring 34 from the first protruding portion 11b3 by a predetermined distance. The straight portion 34a1 of the outer end portion 34a of the spiral spring 34 contacts the second protruding portion 11b4.

Accordingly, because the curved portion 34a2 of the outer end portion 34a of the spiral spring 34 is fitted into the recessed curved portion 11b2 of the engagement portion 11b of the lower arm 11, a displacement of the outer end portion 34a in a direction corresponding to an extending direction of the straight portion 34a1 may be avoided. Furthermore, because an inner circumferential surface of the straight portion 34a1 of the outer end portion 34a (i.e. an inner circumferential surface of the curling portion 34c) contacts the second protruding portion 11b4 and an outer circumferential surface of the straight portion 34a1 positioned radially outwardly of the portion at which the straight portion 34a1 contacts the second protruding portion 11b4 (i.e. an outer circumferential surface of the curling portion 34c) contacts the first protruding portion 11b3, a biasing force of the spiral spring 34 generated about the curved portion 34a2 as a fulcrum is surely and properly received by the engagement portion 11b of the lower arm 11. As a result, an axis of the spiral spring 34 is surely retained on the rotational axis O1.

Furthermore, the engagement protruding portion 32b of the cam 32, at which the inner end portion 34b of the spiral spring 34 is engaged, includes the first engagement protruding portion 32b1 and the second engagement protruding portion 32b2. The first engagement protruding portion 32b1 is provided on the cam 32 so as to contact an end portion of the bent portion 34b1 of the inner end portion 34b of the spiral spring 34. On the other hand, the second engagement protruding portion 32b2 is formed on the cam 32 at a position across the bent portion 34b1 of the spiral spring 34 from the first engagement protruding portion 32b1 by a predetermined distance. Furthermore, the second engagement protruding portion 32b2 engages the spiral spring 34 at an inner portion of the connecting portion 34b2.

Figure 1:
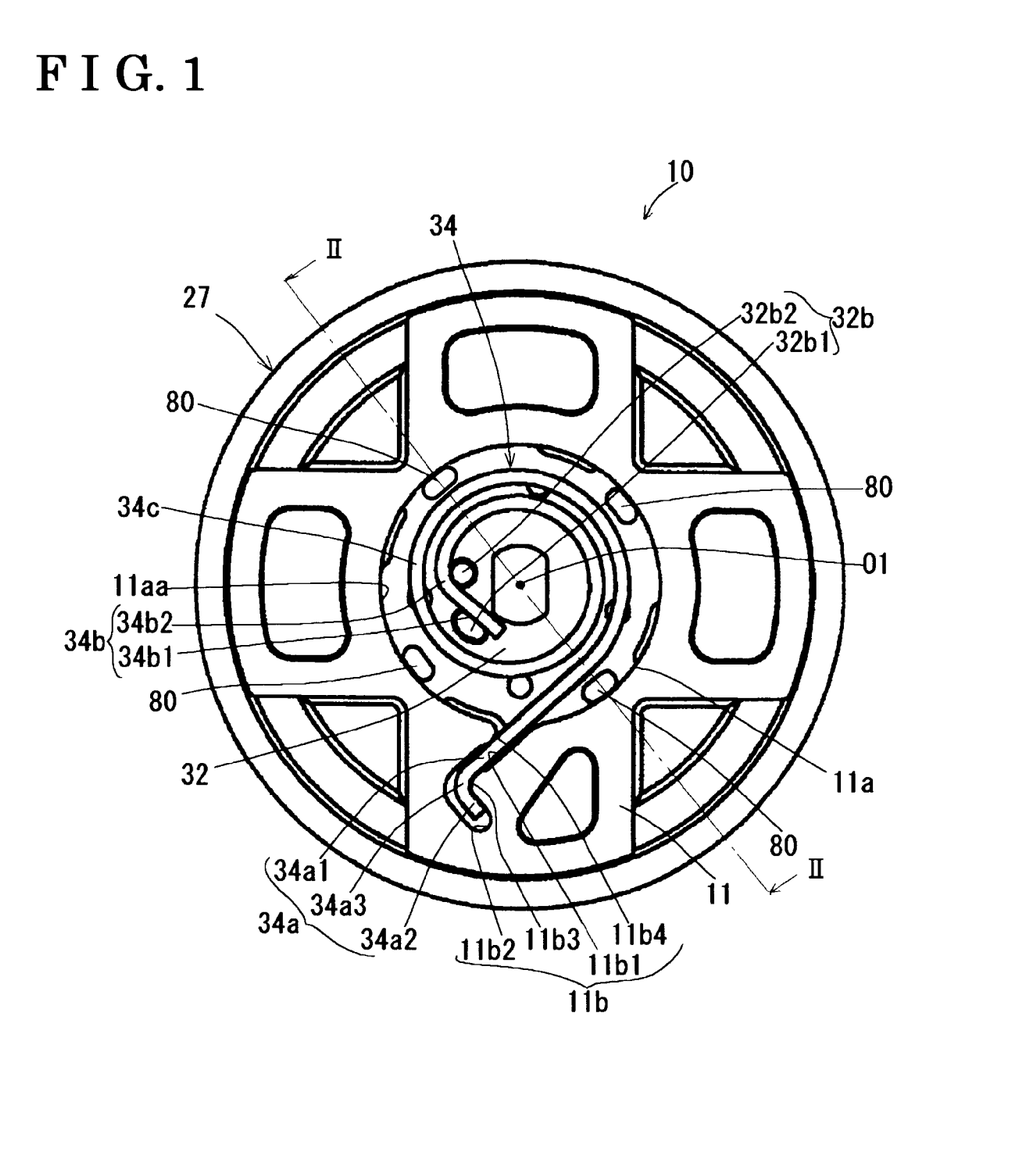
FIG. 1 is a plane view illustrating a seat reclining apparatus according to an embodiment when being viewed from a lower arm.
Figure 2:
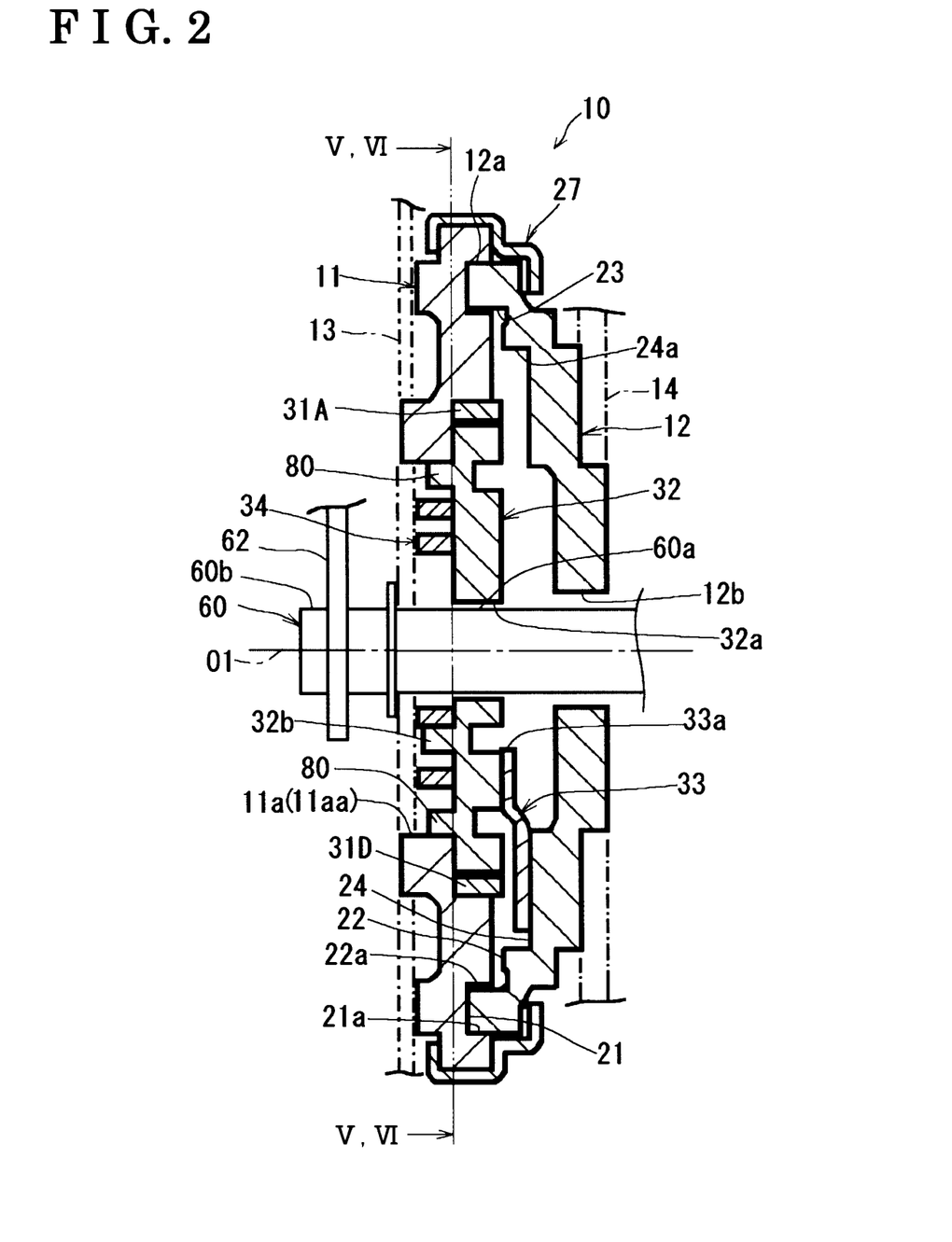
FIG. 2 is a cross-sectional diagram illustrating the seat reclining apparatus taken along line II-II in FIG. 1.

The outer end portion 34a of the spiral spring 34 is engaged within the engagement portion 11b of the lower arm 11 and the inner end portion 34b of the spiral spring 34 is engaged with the engagement protruding portion 32b of the cam 32 while spring force is accumulated at the spiral spring 34, so that the biasing force of the spiral spring 34 is applied to the cam 32 in a clockwise direction in FIG. 1. In this case, the curved portion 34a2 of the outer end portion 34a of the spiral spring 34 is engaged within the recessed curved portion 11b2 of the engagement portion 11b of the lower arm 11, and the straight portion 34a1 of the outer end portion 34a is engaged within the recessed leading portion 11b1 in a state where both side surfaces of the straight portion 34a1 contact the first protruding portion 11b3 and the second protruding portion 11b4, respectively, at positions away from each other by the predetermined distance. Accordingly, a biasing force in a counterclockwise direction in FIG. 1 acts on the spiral spring 34 about the curved portion 34a2 as a fulcrum because of the spring force generated by the spiral spring 34, so that both side surfaces of the straight portion 34a1 contact the first and second protruding portions 11b3 and 11b4, respectively, because of the biasing force. Therefore, the axis of the spiral spring 34 is retained and held on the rotational axis O1. As a result, a position of the axis of the spiral spring 34 is maintained at a substantially same position as an initial position even if the biasing force (an elastic reaction force) generated by the spiral spring 34 changes when the spiral spring 34 is compressed to be rolled, so that an outer circumferential portion of the spiral spring 34 is avoided from contacting the inner circumferential surfaces of the respective restricting protrusion portions 80 facing the axis and a reel of the spiral spring 34 may be avoided from contacting with neighboring portions of the curled reel. Hence, the spring force generated by the spiral spring 34 may be avoided from being decreased because of a friction resistance and the like.

The cam 32 is rotationally biased relative to the lower arm 11 in the locking rotational direction (i.e. in the clockwise direction in FIG. 1) by the biasing force generated by the spiral spring 34 having the above-mentioned configuration. The cam 32 presses the first, second, third and fourth pawls 31A, 31B, 31C and 31D in the radially outward direction at the respective cam surfaces 55, so that the external teeth 44 and 47 of the first, second, third and fourth pawls 31A, 31B, 31C and 31D are meshed with the internal teeth 23 of the upper arm 12.

An operation of the seat reclining apparatus 10 having the above-described configuration will be described below. Illustrated in FIG. 5 is the seat reclining apparatus 10 in a locked state. While the seat reclining apparatus 10 is in the locked state, the first, second and third pressing cam portions 55a, 55b and 55c of the cam 32 contact the corresponding cam contacting portions 45 and 48 of the first, second, third and fourth pawls 31A, 31B, 31C and 31D in order to press the first, second, third and fourth pawls 31A, 31B, 31C and 31D in the radially outward direction. As a result, the external teeth 44 and 47 of the first, second, third and fourth pawls 31A, 31B, 31C and 31D are meshed with the internal teeth 23 of the upper arm 12, thereby restricting the relative rotation between the lower arm 11 and the upper arm 12. In this case, because the cam 32 is allowed to slightly move in the radial direction relative to the hinge shaft 60 within the round-shaped recessed portion 21, the cam 32 may press the first, second, third and fourth pawls 31A, 31B, 31C and 31D with the substantially equal pressing force. Accordingly, the upper arm 12, and furthermore, the seat back frame 14 may be surely locked without generating backlash.

While the seat reclining apparatus 10 is in the locked state, the curved portion 34a2 of the outer end portion 34a of the spiral spring 34 is engaged within the recessed curved portion 11b2 of the engagement portion 11b of the lower arm 11. Therefore, the spiral spring 34 is avoided from being displaced in the direction corresponding to the extending direction of the straight portion 34a1. Furthermore, because the straight portion 34a1 of the outer end portion 34a is fitted within the engagement portion 11b in the state where the side surfaces of the straight portion 34a1 contact the first and second protruding portions 11b3 and 11b4 of the engagement portion 11b of the lower arm 11, respectively, at the positions away from each other by the predetermined distance, the side surfaces of the straight portion 34a1 contact the respective first and second protruding portions 11b3 and 11b4 by the spring force generated by the spiral spring 34. As a result, the axis of the spiral spring 34 is retained and held on the rotational axis O1. Therefore, the spiral spring 34 maintains an initial spiral shape thereof, so that the spiral spring 34 may be avoided from contacting the inner circumferential surfaces of the respective restricting protrusion portions 80 of the cam 32 facing the axis at the outer circumferential portion of the spiral spring 34 and a reduction of the spring force of the spiral spring 34, which is likely to occur due to the friction resistance and the like when the reel of the spiral spring 34 contacts the neighboring portions of the reel, may be avoided.

Furthermore, because the separator member 73, which is provided at the separator acting portion 72 formed between the fourth pawl 31D and the corresponding guide wall 51, is pressed in the radially outward direction by the pressing cam portion 55a of the cam 32, the fourth pawl 31D and the corresponding guide wall 51 receive force in a direction away from each other by the separator member 73, which acts similarly to a wedge (i.e. a wedging action). Accordingly, the lower arm 11 having the guide walls 51 and the upper arm 12, which is engaged with the pawl 31, become rotatable relative to each other, so that the clearance formed between the first, second, third and fourth pawls 31A, 31B, 31C and 31D and the corresponding guide walls 51 in the circumferential direction is closed. As a result, a backlash of a seat back (i.e. the seat back frame 14) relative to a seat cushion (i.e. the seat cushion frame 13) may be avoided from being generated.

In the aforementioned state, because the separator acting portion 72 is positioned at a near side of the locking direction of the cam 32, clearances between the cam 32 and the pawl 31 are generated and widen as the fourth pawl 31D is displaced in the radially outward direction by the separator member 73, which acts on the separator acting portion 72 with having a function similar to a wedge. Therefore, the cam 32 is allowed to be further rotated in the locking direction and the pawls 31 is surely locked even if the separator acting portion 72 is provided at the seat reclining apparatus 10.

Figure 6:
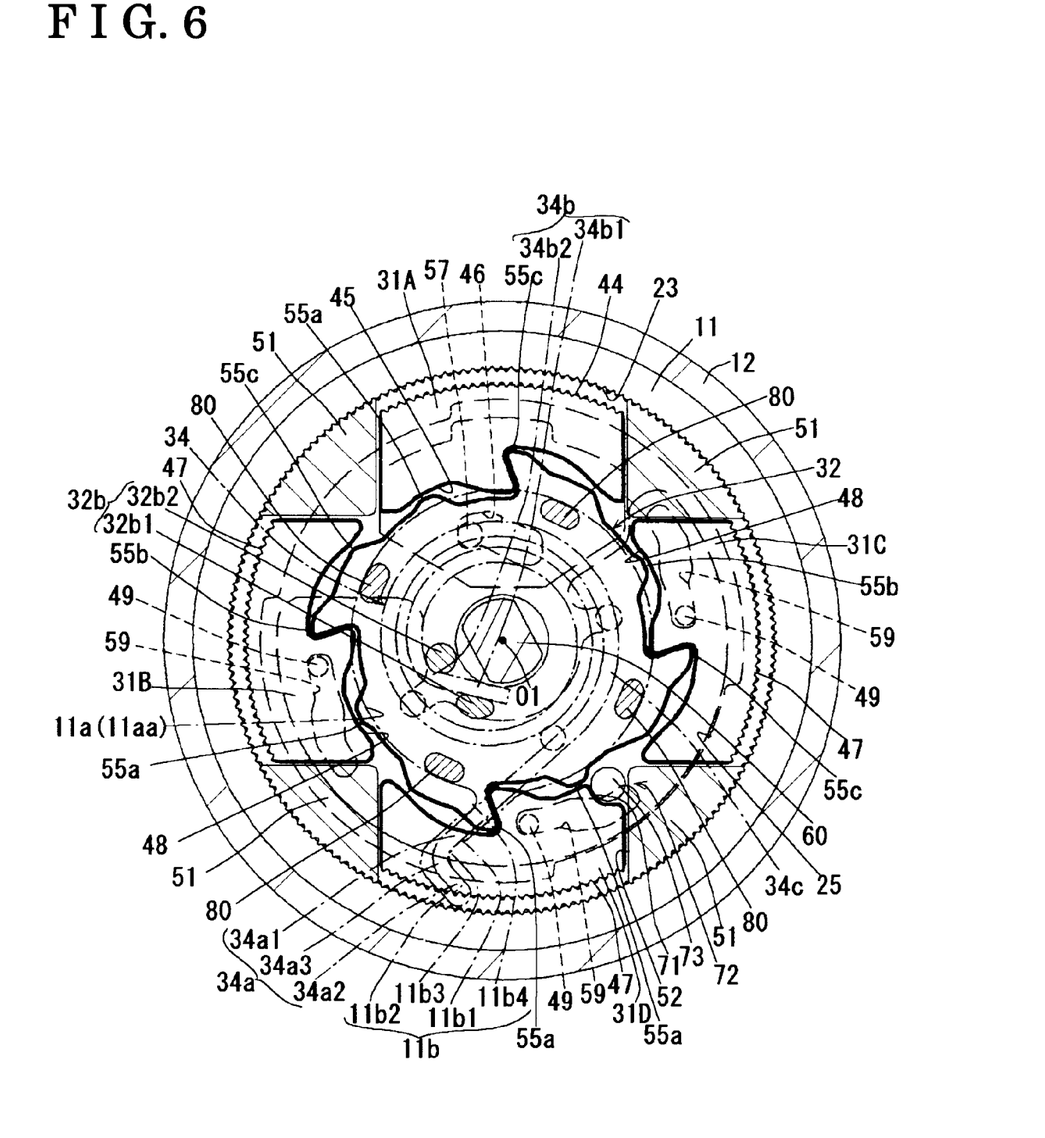
FIG. 6 is a cross-sectional diagram illustrating a state of the lock mechanism when being in an unlocked state taken along line VI-VI in FIG. 2.

In a case where the operation handle 62 is operated and the hinge shaft 60 is rotated in the counterclockwise direction in FIG. 5 while the seat reclining apparatus 10 is in the locked state, the cam 32 and the release plate 33 are integrally rotated as a unit so as to resist against the biasing force generated by the spiral spring 34. Accordingly, the first and second pressing cam portions 55a and 55b of the cam surfaces 55 are detached from the corresponding cam contacting portions 45 and 48 of the first, second, third and fourth pawls 31A, 31B, 31C and 31D, and the pressing cam portions 55c of the corresponding cam surfaces 55 are also displaced in the direction by which the pressing cam portions 55c do not interfere with the corresponding cam contacting portions 45 and 48. Furthermore, the first pawl 31A is displaced (guided) towards the rotational axis O1 along the corresponding guide surfaces 52 of the guide walls 51 because of an engagement between the guide groove 46 of the first pawl 31A and the corresponding engagement protrusion 57 of the cam 32. As a result, the external teeth 44 of the first pawl 31A are disengaged from the internal teeth 23 of the upper arm 12. Simultaneously, the second, third and fourth pawls 31B, 31C and 31D are displaced (guided) towards the rotational axis O1 along the corresponding guide surfaces 52 of the guide walls 51 because of the engagement between the engagement protrusions 49 of the respective second, third and fourth pawls 31B, 31C and 31D and the corresponding guide grooves 59 of the release plate 33. Accordingly, the external teeth 47 of the second, third and fourth pawls 31B, 31C and 31D are disengaged from the internal teeth 23 of the upper arm 12. As a result, the seat reclining apparatus 10 is turned to be in an unlocked state as illustrated in FIG. 6.

Accordingly, the seat back, which is supported by the seat back frame 14, becomes rotatable relative to the seat cushion, which is supported by the seat cushion frame 13, so that the seat back is rotated to any desired angular position. In this case, because the restricting protrusion portions 80 of the cam 32 slidably contact the inner circumferential surface 11aa of the through hole 11a of the lower arm 11, an eccentricity of the cam 32 is avoided by the inner circumferential surface 11aa of the through hole 11a, so that the cam 32 is normally aligned. As a result, clearances formed between each of the external teeth 44 and 47 of the first, second, third and fourth pawls 31A, 31B, 31C and 31D on the one hand and the internal teeth 23 of the upper arm 12 on the other hand become substantially even, so that rotation failure, a noise and the like generated when tooth top of the pawl 31 interferes with a tooth top of the internal teeth 23 may be avoided.

In a case where the seat back (the seat back frame 14) is rotated relative to the seat cushion (the seat cushion frame 13) towards front by equal to or greater than a predetermined angle, in other words, in a case where the seat back is rotated so as to be positioned within a forward inclined angular range, while the seat reclining apparatus 10 is in the unlocked state, one of the protruding portions 25, which are formed on the inner circumferential surface of the second round-shaped recessed portion 24 of the upper arm 12, is positioned between the engagement portion 43 of the first pawl 31A and the internal teeth 23 of the upper arm 12. In other words, because the engagement portion 43 of the first pawl 31A is engaged with one of the protruding portions 25 of the upper arm 12, the first pawl 31A is avoided from being displaced in the radially outward direction. When the operation of the operation handle 62 is cancelled (i.e. when a user releases the operation handle 62) while the above-mentioned state is established, the cam 32 is expected to press the first pawl 31A in a direction by which the first pawl 31A engages with the internal teeth 23 because of an acting force generated by the spiral spring 34. However, because the engagement portion 43 of the first pawl 31A engages with one of the protruding portions 25 of the upper arm 12, the displacement of the first pawl 31A is restricted, therefore, the external teeth 44 of the first pawl 31A do not engage with the internal teeth 23 of the upper arm 12. Simultaneously, because the displacement of the first pawl 31A in the radial direction is prevented, the rotation of the cam 32 is also restricted, therefore, the release plate 33 is not allowed to rotate. Accordingly, the second, third and fourth pawls 31B, 31C and 31D are retained at positions, at which the second, third and fourth pawls 31B, 31C and 31D are away from the internal teeth 23 of the upper arm 12 so as not to be meshed therewith, because of the engagement between the engagement portions 49 of the second, third and fourth pawls 31B, 31C and 31D and the guide grooves 59 of the release plate 33, respectively. As a result, the seat back is not locked and is freely rotatable within the forward inclined angular range.

When operation lever 62 is operated again while the seat back is in the forwardly inclined state in order to rotate the seat back in a rearward direction (in a front-rear direction of the vehicle) so as to be rotated to an appropriate position for an occupant to sit thereon and then the operation lever 62 is released, the first, second, third and fourth pawls 31A, 31B, 31C and 31D, the cam 32 and the release plate 33 are returned to positions as illustrated in FIG. 5, thereby turning the seat reclining apparatus 10 to be in the locked state.

As described above, the restricting recessed portions 80 for restricting the eccentricity of the cam 32 when rotating in the manner where the restricting recessed portions 80 slidably contact the inner circumferential surface 11aa of the through hole 11a, which is formed at the rotational center portion of the lower arm 11 as the accommodating portion, are provided at the second side surface 32d of the cam 32 facing the lower arm 11. According to a known seat reclining apparatus, in a case where a number of pawls is increased, an area of arc-shaped wall surfaces for restricting an eccentricity of a cam when rotating by guiding an outer circumferential surface of the cam is reduced due to a limited space allocated for the wall surfaces. On the other hand, according to the seat reclining apparatus 10 of the embodiment, because an arc-shaped wall surface does not need to be formed at each of the guide walls 51, a number of pawl 31 may be increased in order to enhance an engagement strength of the pawl 31 relative to the upper arm 12.

Furthermore, the engagement protruding portion 32b (i.e. the first and second engagement protruding portions 32b1 and 32b2) for engaging therewith the inner end portion 34b of the spiral spring 34 is formed at the second side surface 32d of the cam 32 facing the lower arm 11 at the position radially inwardly of the restricting protrusion portions 80. In other words, the restricting protrusion portions 80 and the engagement protruding portion 32b (the first and second engagement protruding portions 32b1 and 32b2) are formed on the second side surface 32d of the cam at positions displaced from each other in the radial direction of the cam 32. Therefore, the restricting protrusion portions 80, the engagement protruding portion 32b (the first and second engagement protruding portions 32b1 and 32b2) and the spiral spring 34, which is engaged with the engagement protruding portion 32b (the first and second engagement protruding portions 32b1 and 32b2), are accommodated (arranged) within the range corresponding to the thickness of the through hole 11a of the lower arm 11. Hence, a thickness of the seat reclining apparatus 10 in the rotational axis direction may be reduced, which may further result in reducing a size and weight of the seat reclining apparatus 10.

The through hole 11a of the lower arm 11 includes the inner circumferential surface 11aa, at which the restricting protrusion portions 80 of the cam 32 slidably contact, and the engagement portion 11b, within which the outer end portion 34a of the spiral spring 34 is engaged and which is formed at a position not interfering with the slidably contact range of the restricting protrusion portions 80 in response to the operation of the cam 32. Therefore, even if the engagement protruding portion 32b for engaging therewith the inner end portion 34b of the spiral spring 34 is formed on the second surface 32d of the cam 32, at which the restricting protrusion portions 80 are formed, at the position radially inwardly of the restricting protrusion portions 80, the cam 32 may be rotated while avoiding the eccentricity thereof because of the restricting protrusion portions 80 and the biasing force generated by the spiral spring 34.

The restricting protrusion portions 80 and the engagement protruding portion 32b (the first and second engagement protruding portions 32b1 and 32b2) are formed at the cam 32 by applying the half blanking thereto. Hence, the restricting protrusion portions 80 and the engagement protruding portion 32b (the first and second engagement protruding portions 32b1 and 32b2) do not need to be provided at the seat reclining apparatus 10 as individual and separate components. As a result, the size and weight of the seat reclining apparatus 10 may be reduced, which my further result in reducing manufacturing costs of the seat reclining apparatus 10.

The first, second, third and fourth pawls 31A, 31B, 31C and 31D are arranged in a cross shape in order to increase an engagement ratio between the external teeth 44 and 47 of the first, second, third and fourth pawls 31A, 31B, 31C and 31D on the one hand and the internal teeth 23 of the upper arm 12 on the other hand. Accordingly, the engagement strength of the first, second, third and fourth pawls 31A, 31B, 31C and 31D relative to the upper arm 12 may be increased.

Furthermore, the spiral spring 34 is provided within the through hole 11a of the lower arm 11 while avoiding the contact with the inner circumferential surfaces of the respective restricting protrusion portions 80. Therefore, the cam 32 is rotated so as not to be eccentric by the restricting protrusion portions 80 while receiving the biasing force of the spiral spring 34, because the spiral spring 34 and the restricting protrusion portions 80 do not interfere with each other.

In the above-described embodiment, four restricting protrusion portions 80 are formed on the cam 32 along the circumferential direction thereof. However, the seat reclining apparatus 10 may be modified so as to include at least three restricting protrusion portions 80 or equal to or more than five restricting protrusion portions 80. Furthermore, in the above-described embodiment, each of the restricting protrusion portions 80 is formed in an elliptic column shape. However, each of the restricting protrusion portions 80 may be formed in a column shape and the like. In the above-described embodiment, the pawl 31 includes two different types of pawls 31 (i.e. the first pawl 31A as one type and the second, third and fourth pawls 31B, 31C and 31D as the other type). However, the pawl 31 may include plurality of one type of pawl (e.g. plural first pawls 31A) and the separator member 73 is provided at one of the plural pawls 31A. In this case, the release plate 33 may be eliminated from the seat reclining apparatus 10. Still further, the number of pawls is not limited to four, but five or more of the pawls may be provided on the cam 32 along the circumferential direction thereof.

Accordingly, the restricting protrusion portions 80, which slidably contact the inner circumferential surface 11aa of the through hole 11a formed at the rotational center portion of the lower arm 11 as the accommodating portion in order to restrict the eccentricity of the cam 32 when rotating, are provided at the second side surface 32d of the cam 32 facing the lower arm 11. According to a known seat reclining apparatus, when a number of pawl is increased, an area of arc-shaped wall surfaces for restricting an eccentricity of a cam by guiding an outer circumferential surface of the cam is reduced because of a limited space allocated for the pawls. However, according to the embodiment, because the arc-shaped wall surfaces do not need to be formed at respective guide portions, the number of pawls may be increased in order to enhance the engagement strength of the pawl 31 relative to the upper arm 12. Furthermore, the engagement protruding portion 32b for engaging therewith the inner end portion 34b of the spiral spring 34 is formed at the second side surface 32d of the cam 32 facing the lower arm 11 at the position radially inwardly of the restricting protrusion portions 80. In other words, the restricting protrusion portions 80 and the engagement protruding portion 32b are formed on the same surface of the cam 32 while being arranged so as to be displaced from each other in the radial direction of the cam 32. Accordingly, the restricting protrusion portions 80, the engagement protruding portion 32b and the spiral spring 34 are arranged within the range corresponding to the thickness of the through hole 11a of the lower arm 11 in the axial direction. As a result, the thickness of the seat reclining apparatus 10 in the rotational axis direction may be reduced, which may further result in reducing the size and weight of the seat reclining apparatus 10.

Accordingly to the embodiment, the through hole 11a includes the inner circumferential surface 11aa, at which the restricting protrusion portions 80 of the cam 32 slidably contact, and the engagement portion 11b, within which the outer end portion 34a of the spiral spring 34 is engaged, at the position not interfering with the slidably contact range of the restricting protrusion portions 80 when the cam 32 is operated.

Accordingly, because the engagement portion 11b (the engagement cut-out portion) for engaging therewith the outer end portion 34a of the spiral spring 34 is formed at the lower arm 11 at the position where the engagement portion 11b (the engagement cut-out portion) does not interfere with the slidably contact range of the restricting protrusion portions 80, the cam 32 may be biased by the spiral spring 34 so as to rotate while avoiding the eccentricity of the cam 32 by the restricting protrusion portions 80 even if the engagement protruding portion 32b for engaging therewith the inner end portion 34b of the spiral spring 34 is provided on the same surface where the restricting protrusion portions 80 are formed and so as to be positioned radially inwardly of the restricting protrusion portions 80.

According to the embodiment, the restricting protrusion portions 80 and the engagement protruding portion 32b are formed on the cam 32 by applying the half blanking thereto from the first side surface 32c of the cam 32 facing the upper arm 12 towards the second side surface 32d of the cam 32 facing the lower arm 11.

Accordingly, because the restricting protrusion portions 80 and the engagement protruding portion 32b are formed on the cam 32 by applying the half blanking thereto, the restricting protrusion portions 80 and the engagement protruding portion 32b do not need to be provided at the seat reclining apparatus 10 as individual and separate components. As a result, the size and weight of the seat reclining apparatus 10 may be reduced, which may further result in reducing the manufacturing costs of the seat reclining apparatus 10.

According to the embodiment, the seat reclining apparatus 10 includes four pawls (31A, 31B, 31C, 31D), which are arranged within the lower arm 11 in the manner where two of the four pawls (31A, 31B, 31C, 31D) are aligned in a diametrical direction so as to be orthogonal to the aligned other two of the four pawls (31A, 31B, 31C, 31D) while allowing the pawls (31A, 31B, 31C, 31D) to be movable along the guide walls 51 in the radial direction.

Accordingly, because four pawls 31 are arranged in the cross shape in order to increase the engagement ratio of the external teeth 44 and 47 relative to the internal teeth 23 of the upper arm 12, the engagement strength of the first, second, third and fourth pawls 31A, 31B, 31C and 31D relative to the upper arm 12 may be increased.

According to the embodiment, the spiral spring 34 is provided within the through hole 11a while avoiding a contact with the inner circumferential surfaces of the respective restricting protrusion portions 80.

Accordingly, because the spiral spring 34 is arranged within the through hole 11a while avoiding the contact between the outer circumferential portion of the spiral spring 34 and the inner circumferential surfaces of the respective restricting protrusion portions 80, the cam 32 may be rotated so as not to be eccentric by the restricting protrusion portions 80 while receiving the biasing force generated by the spiral spring 34 because the spiral spring 34 and the restricting protrusion portions 80 do not interfere with each other.

The principles, preferred embodiment and mode of operation of this disclosure have been described in the foregoing specification. However, the disclosure which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the disclosure as defined in the claims, be embraced thereby.

The invention claimed is:

1. A seat reclining apparatus comprising:
a lower arm adapted to be supported by a seat cushion;
an upper arm adapted to be supported by a seat back and supported by the lower arm so as to be rotatable relative to the lower arm;
a plurality of pawls provided at an inside of the lower arm so as to be movable in a radial direction thereof along guide walls provided at the lower arm and including external teeth, which are engageable with and disengageable from internal teeth formed on an inner circumferential surface of the upper arm;
a cam including a cam surface, at which the cam contacts a cam contacting portion formed on each of the plurality of pawls, and pressing the pawls in a direction by which the external teeth of the pawls mesh with the internal teeth of the upper arm in response to a rotation of the cam in a locking direction;
a biasing member arranged within an accommodating portion, which is formed on a rotational center portion of the lower arm, engaged with an inner circumferential surface of the accommodating portion at a first end portion, engaged with the cam at a second end portion and biasing the cam so as to rotate the cam in the locking direction;
a restricting protrusion portion formed on a surface of the cam facing the lower arm and being in direct sliding contact with the inner circumferential surface of the accommodating portion that is radially outward of the restricting protrusion portion, in order to avoid an eccentricity of the cam when being rotated; and
an engagement protruding portion provided on the surface of the cam facing the lower arm at a position displaced from the restricting protrusion portion in a radially inward direction of the cam and engaging therewith the second end portion of the biasing member.

2. The seat reclining apparatus according to claim 1, wherein the accommodating portion includes the inner circumferential surface in direct sliding contact with the restricting protrusion portion, and an engagement cut-out portion, within which the first end portion of the biasing member is engaged, at a position not interfering with a range of direct sliding contact of the restricting protrusion portion when the cam is operated.

3. The seat reclining apparatus according to claim 2, wherein the restricting protrusion portion and the engagement protruding portion are formed on the cam by applying a half blanking thereto from a surface of the cam facing the upper arm towards the surface of the cam facing the lower arm.

4. The seat reclining apparatus according to claim 3, wherein the plurality of pawls includes four pawls,
wherein the four pawls are arranged within the lower arm in a manner where a first pair of the four pawls are aligned in a first diametrical direction and orthogonal to a second pair of the four pawls which are aligned in a second diametrical direction, while allowing the four pawls to be movable along the guide walls in the radial direction.

5. The seat reclining apparatus according to claim 1, wherein the biasing member is provided within the accommodating portion while avoiding a contact with an inner circumferential surface of the restricting protrusion portion.

6. The seat reclining apparatus according to claim 3, wherein the biasing member is provided within the accommodating portion while avoiding a contact with an inner circumferential surface of the restricting protrusion portion.

7. The seat reclining apparatus according to claim 2, wherein the plurality of pawls includes four pawls,
wherein the four pawls are arranged within the lower arm in a manner where a first pair of the four pawls are aligned in a first diametrical direction and orthogonal to a second pair of the four pawls which are aligned in a second diametrical direction, while allowing the four pawls to be movable along the guide walls in the radial direction.

8. The seat reclining apparatus according to claim 7, wherein the biasing member is provided within the accommodating portion while avoiding a contact with an inner circumferential surface of the restricting protrusion portion.

9. The seat reclining apparatus according to claim 2, wherein the biasing member is provided within the accommodating portion while avoiding a contact with an inner circumferential surface of the restricting protrusion portion.

10. The seat reclining apparatus according to claim 1, wherein the restricting protrusion portion and the engagement protruding portion are formed on the cam by applying a half blanking thereto from a surface of the cam facing the upper arm towards the surface of the cam facing the lower arm.

11. The seat reclining apparatus according to claim 10, wherein the plurality of pawls includes four pawls,
wherein the four pawls are arranged within the lower arm in a manner where a first pair of the four pawls are aligned in a first diametrical direction and orthogonal to a second pair of the four pawls which are aligned in a second diametrical direction, while allowing the four pawls to be movable along the guide walls in the radial direction.

12. The seat reclining apparatus according to claim 11, wherein the biasing member is provided within the accommodating portion while avoiding a contact with an inner circumferential surface of the restricting protrusion portion.

13. The seat reclining apparatus according to claim 10, wherein the biasing member is provided within the accommodating portion while avoiding a contact with an inner circumferential surface of the restricting protrusion portion.

14. The seat reclining apparatus according to claim 1, wherein the plurality of pawls includes four pawls,
wherein the four pawls are arranged within the lower arm in a manner where a first pair of the four pawls are aligned in a first diametrical direction and orthogonal to a second pair of the four pawls which are aligned in a second diametrical direction, while allowing the four pawls to be movable along the guide walls in the radial direction.

15. The seat reclining apparatus according to claim 14, wherein the biasing member is provided within the accommodating portion while avoiding a contact with an inner circumferential surface of the restricting protrusion portion.

16. The seat reclining apparatus according to claim 1, wherein the biasing member is provided within the accommodating portion while avoiding a contact with an inner circumferential surface of the restricting protrusion portion.

* * * * *